United States Patent
Chiba et al.

(10) Patent No.: US 10,185,493 B2
(45) Date of Patent: Jan. 22, 2019

(54) PROCESSING SYSTEM

(71) Applicant: DISCO CORPORATION, Tokyo (JP)

(72) Inventors: Shinya Chiba, Tokyo (JP); Jun Takaba, Tokyo (JP)

(73) Assignee: Disco Corporation, Tokyo (JP)

(*) Notice: Subject to any disclaimer, the term of this patent is extended or adjusted under 35 U.S.C. 154(b) by 65 days.

(21) Appl. No.: 15/184,536

(22) Filed: Jun. 16, 2016

(65) Prior Publication Data

US 2016/0370905 A1    Dec. 22, 2016

(30) Foreign Application Priority Data

Jun. 16, 2015   (JP) .................................. 2015-120917

(51) Int. Cl.
    *G06F 3/041*    (2006.01)
    *G06F 3/0488*   (2013.01)
    *G05B 19/00*    (2006.01)
    *B23Q 1/00*     (2006.01)

(52) U.S. Cl.
    CPC ......... *G06F 3/04886* (2013.01); *G05B 19/00* (2013.01); *B23Q 1/0045* (2013.01); *G06F 2203/04805* (2013.01)

(58) Field of Classification Search
    None
    See application file for complete search history.

(56) References Cited

U.S. PATENT DOCUMENTS

| | | | | |
|---|---|---|---|---|
| 2008/0168349 A1* | 7/2008 | Lamiraux | ............. | G06F 3/0482 715/702 |
| 2014/0267437 A1* | 9/2014 | Mazzola | ................ | G09G 5/373 345/661 |
| 2015/0266161 A1* | 9/2015 | Noda | ...................... | B24C 1/045 700/160 |

FOREIGN PATENT DOCUMENTS

JP    2000-187544    7/2000

\* cited by examiner

*Primary Examiner* — Joseph Haley
(74) *Attorney, Agent, or Firm* — Greer Burns & Crain Ltd.

(57) ABSTRACT

A touch panel device includes a display section for displaying a plurality of input fields, an enlarged display section for displaying, at enlarged scale, one of the input fields in which the operator wants to enter data and which is touched by the operator, and an input section for entering processing condition data from the input field displayed at enlarged scale.

3 Claims, 6 Drawing Sheets

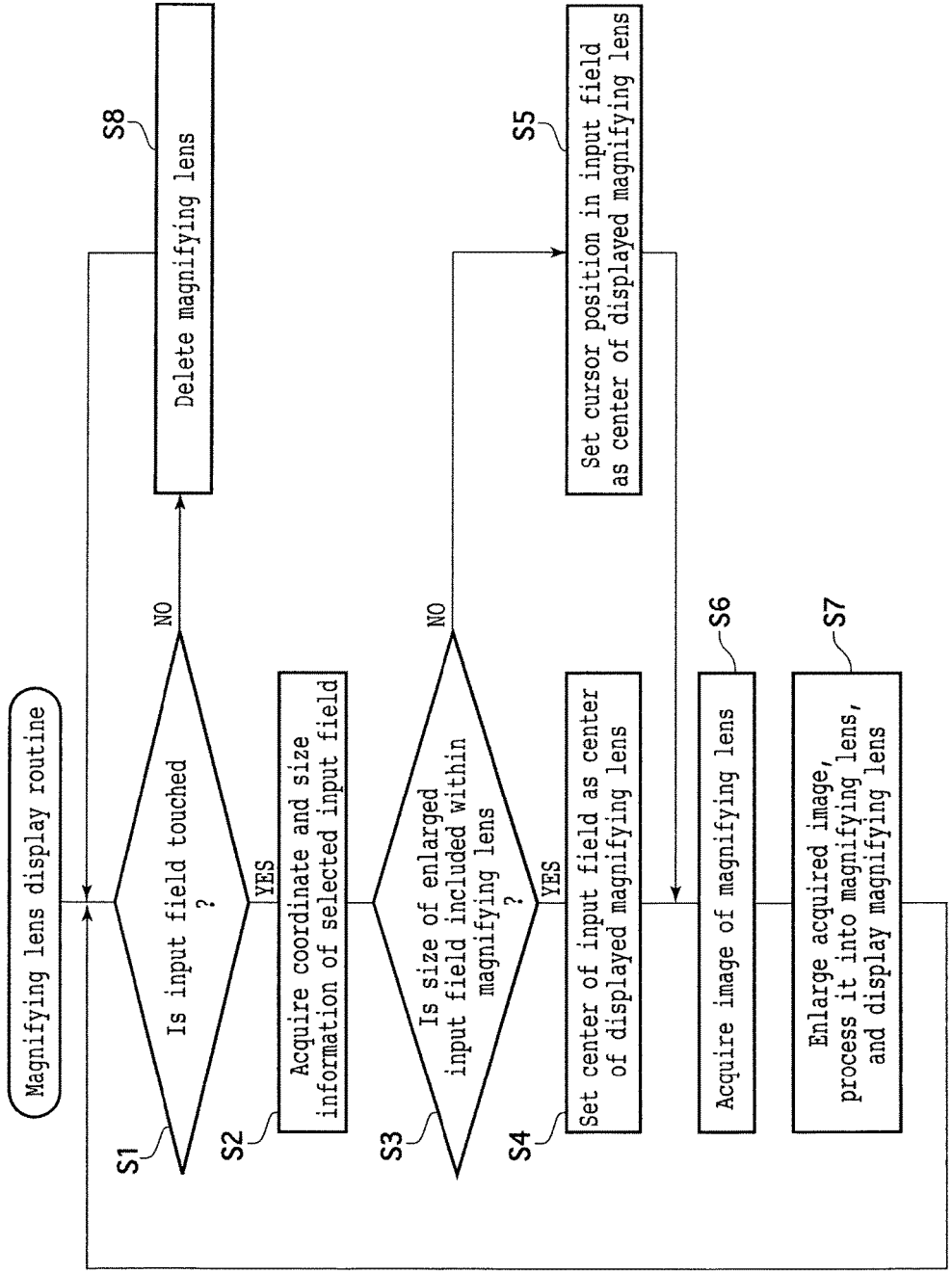

PROCESSING SYSTEM

BACKGROUND OF THE INVENTION

Field of the Invention

The present invention relates to a touch panel device incorporated in a processing apparatus.

Description of the Related Art

In recent years, touch-operated panels have become mainstream as input devices for entering data. However, since a touch-operated panel displays a keyboard as input means on a data input screen, input fields that are displayed on the data input screen are relatively small. Therefore, the touch-operated panel has an operability problem in that the operator may possibly enter data in an input field which is different from an intended input field, and is also problematic because if there are a plurality of input fields, then the operator is likely to lose sight of an input field while entering data therein. In order to solve these problems, attempts have been made to display a selected input field at enlarged scale or to display a selected input field as a pop-up at a certain position, for example (see, for example, Japanese Patent Laid-open No. 2000-187544).

SUMMARY OF THE INVENTION

However, when an enlarged input field is displayed, another input field adjacent thereto is concealed from view. When the operator then needs to enter data in the concealed input field, the operator is required to close the enlarged input field and then to select the concealed input field. Such a process is tedious and time-consuming. Furthermore, the operator often intuitively memorizes the position of an input field and an input item in association with each other. Therefore, when a pop-up is displayed in a particular position, since the operator is unable to intuitively recognize an input item from the position of an input field, the operator has to go to the trouble of confirming the input item, which results in a reduction in the working efficiency with which to enter data.

According to another effort to prevent the operator from losing sight of an input field while entering data therein, the input field may be colored or may be surrounded by a colored frame. However, inasmuch as data are entered in various environments, there may be an instance where the operator fails to clearly recognize the color of the input field or the frame under a certain light.

Therefore, it is an object of the present invention to provide a touch panel device incorporated in a processing apparatus, which allows the operator to enter data in a desired input field without involving extra work and reducing the working efficiency.

In accordance with an aspect of the present invention, there is provided a touch panel device provided on a processing apparatus, including display means for displaying a plurality of input fields, enlarged display means for displaying, at enlarged scale, one of the input fields in which the operator wants to enter data and which is touched by the operator, and input means for entering processing condition data from the input field displayed at enlarged scale.

When the operator of the touch panel device according to the present invention touches an input field in which to enter data, the enlarged display means displays, at enlarged scale, a predetermined region including the touched input field. Therefore, the operator is prevented from entering data in wrong input fields and also from losing sight of the input field while entering data therein. Even if the operator memorizes the position of an input field and an input item in association with each other, since the position of the input field displayed at enlarged scale is not moved per se, the operator can enter data in the original position and can intuitively recognize an input item, and the working efficiency with which the operator enters data is not reduced. With the input field displayed at enlarged scale, the operator is able to recognize the input field at a glance even under a colored light or the like, and does not lose sight of the input field.

The above and other objects, features and advantages of the present invention and the manner of realizing them will become more apparent, and the invention itself will best be understood from a study of the following description and appended claims with reference to the attached drawings showing a preferred embodiment of the invention.

BRIEF DESCRIPTION OF THE DRAWINGS

FIG. 5 is a flowchart of a process for displaying a magnifying lens;

DETAILED DESCRIPTION OF THE PREFERRED EMBODIMENT

Figure 1:
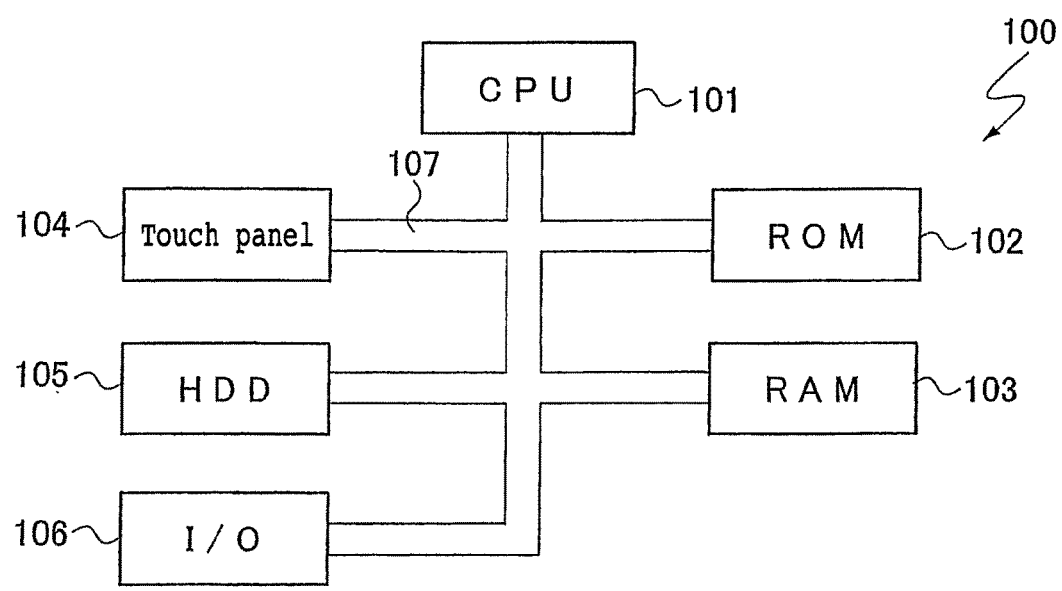
FIG. 1 is a block diagram showing a hardware configuration example of a touch panel device according to an embodiment of the present invention.

FIG. 1 shows a hardware configuration of a touch panel device 100 according to an embodiment of the present invention. As shown in FIG. 1, the touch panel device 100 includes a CPU 101, a ROM 102, a RAM 103, a touch panel 104, an HDD 105, and an I/O interface 106 which are interconnected by a bus 107. The CPU 101 reads programs stored in the ROM 102 and the RAM 103 and executes the read programs. When necessary, the CPU 101 also reads data stored in the RAM 103 and stores data in the RAM 103. The HDD 105, which is a hard disk drive, stores a program for performing a process for displaying data on the touch panel 104 and also stores data to be displayed on the touch panel 104. The I/O interface 106 serves as an interface between the touch panel device 100 and various input/output devices, and inputs and outputs data to transfer them between the touch panel device 100 and the input/output devices.

Figure 2:
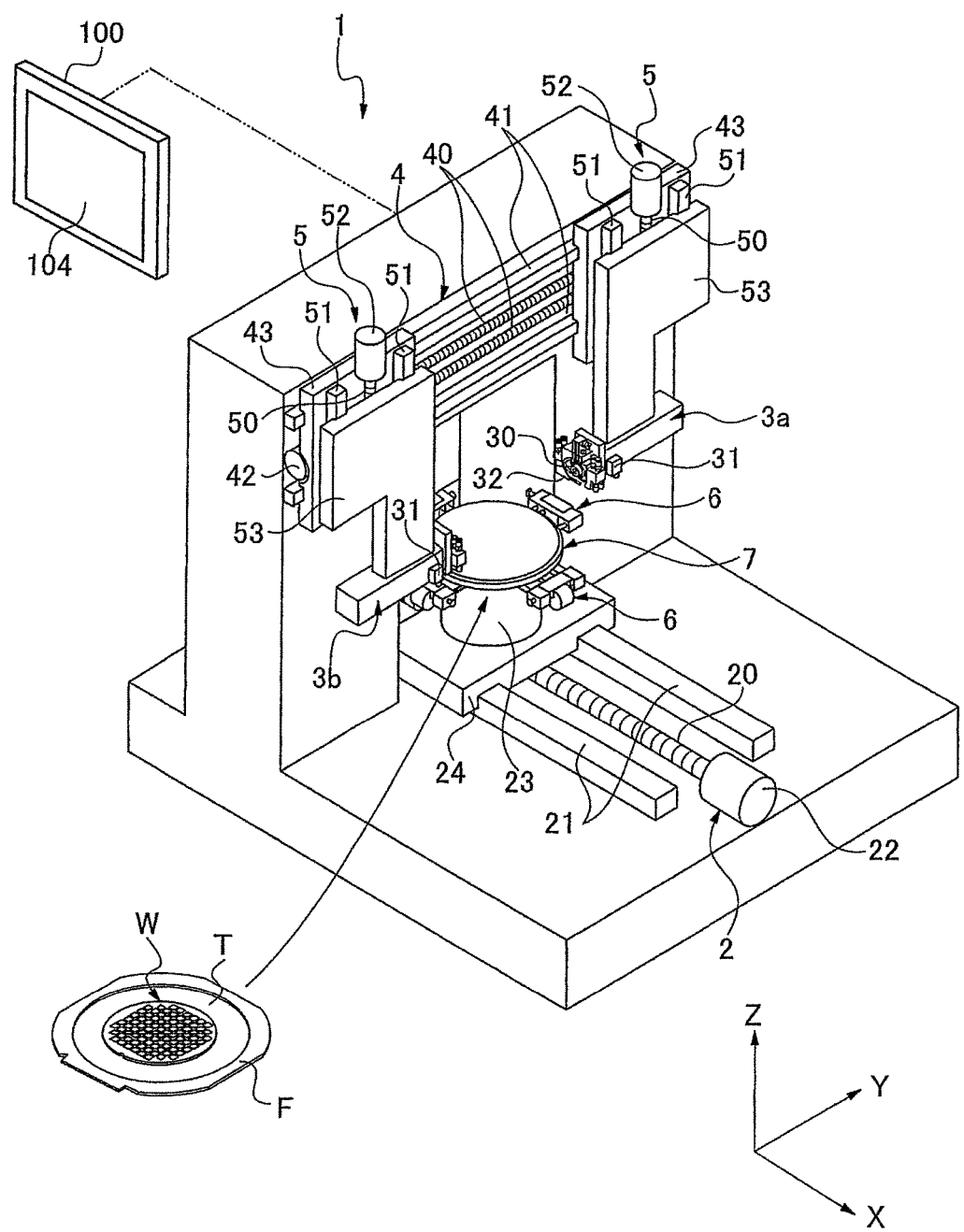
FIG. 2 is a perspective view of a cutting apparatus which incorporates the touch panel device therein.

The touch panel device 100 is incorporated in a cutting apparatus 1 shown in FIG. 2, for example. The cutting apparatus 1 is an apparatus which cuts a wafer W held on a chuck table 7 with first and second first and second cutting means 3a and 3b. The operator of the cutting apparatus 1 can enter conditions for cutting the wafer W through the touch panel 104 of the touch panel device 100.

The wafer W to be cut by the cutting apparatus 1 is supported on a ring-shaped frame F through a dicing tape T. The chuck table 7 attracts and holds the wafer W under suction through the dicing tape T. Clamps 6 for fixing the frame F are disposed around the chuck table 7. The frame F is securely held by the clamps 6.

The chuck table 7 and the clamps 6 are fed in an X-axis direction by cutting feed means 2. The cutting feed means 2 includes a ball screw 20 extending in the X-axis direction, a pair of guide rails 21 disposed parallel to and one on each side of the ball screw 20, a motor 22 coupled to an end of the ball screw 20, and a movable base 24 having therein a nut threaded over the ball screw 20 and a bottom surface held in slidable contact with the guide rails 21. When the motor 22 is energized to rotate the ball screw 20 about its own axis, the movable base 24 moves in the X-axis direction while being guided by the guide rails 21. Rotating means 23 for rotating the chuck table 7 and the clamps 6 is disposed on the movable base 24. When the movable base 24 moves in the X-axis direction, the chuck table 7, the clamps 6, and the rotating means 23 also move in the X-axis direction.

Each of the first and second cutting means 3*a* and 3*b* includes a rotatable cutting blade 30, image capturing means 31 for capturing an image of the wafer W as a workpiece and detecting a position where the wafer W is to be cut, and a cutting water nozzle 32 for supplying cutting water to the cutting blade 30. The cutting blade 30 of the first cutting means 3*a* and the cutting blade (not shown) of the second cutting means 3*b* face each other along a Y-axis direction.

The first and second cutting means 3*a* and 3*b* can be actuated by respective incising feed means 5 for movement along a Z-axis direction. Each of the incising feed means 5 includes a ball screw 50 extending in the Z-axis direction, a pair of guide rails 51 disposed parallel to and one on each side of the ball screw 50, a motor 52 coupled to an end of the ball screw 50, and a vertically movable base 53 having therein a nut threaded over the ball screw 50 and a side surface held in slidable contact with the guide rails 51. When the motor 52 is energized to rotate the ball screw 50 about its own axis, the vertically movable base 53 moves in the Z-axis direction while being guided by the guide rails 51. The first and second cutting means 3*a* and 3*b* are fixed to respective lower portions of the vertically movable bases 53. When the vertically movable bases 53 move in the Z-axis direction, the first and second cutting means 3*a* and 3*b* also move in the Z-axis direction.

The first cutting means 3*a* and the incising feed means 5 for moving the first cutting means 3*a* in the Z-axis direction, and the second cutting means 3*b* and the incising feed means 5 for moving the second cutting means 3*b* in the Z-axis direction are actuated by indexing feed means 4 for movement along the Y-axis direction. The indexing feed means 4 includes a pair of ball screws 40 extending in the Y-axis direction, a pair of guide rails 41 disposed parallel to and one on each side of the ball screws 40, a motor 42 coupled to ends of the ball screws 40, and a pair of movable bases 43 having therein respective nuts threaded over the ball screws 40 and side surfaces held in slidable contact with the guide rails 41. When the motor 42 is energized to rotate the ball screws 40 about their own axes, the movable bases 43 move in the Y-axis direction while being guided by the guide rails 41. The incising feed means 5 are mounted on sides of the respective movable bases 43. When the movable bases 43 move in the Y-axis direction, the incising feed means 5 and the first and second cutting means 3*a* and 3*b* also move in the Y-axis direction.

For cutting the wafer W held on the chuck table 7, an image of its surface is captured by each of the image capturing means 31 and a position where the surface of the wafer W is to be cut, i.e., a street on the surface of the wafer W which is to be cut, is detected in the captured image. After the street to be cut which has been detected and the corresponding cutting blade 30 are positionally aligned in the Y-axis direction by the indexing feed means 4, the chuck table 7 moves in the X-axis direction, and each of the incising feed means 5 lowers the corresponding one of the first and second cutting means 3*a* and 3*b*, causing the rotating cutting blade 30 into the detected street. After each of the first and second cutting means 3*a* and 3*b* has cut the street, the indexing feed means 4 feeds each of the first and second cutting means 3*a* and 3*b* by a distance corresponding to a street-to-street interval in the Y-axis direction. Then, each of the first and second cutting means 3*a* and 3*b* cuts a next street in the same manner. After all streets extending in one direction on the surface of the wafer W have been cut, the chuck table 7 is turned 90° by the rotating means 23, and all other streets extending perpendicularly to the previously cut streets on the surface of the wafer W are cut. The wafer W is thus severed into individual chips along the streets that cross each other in a grid pattern on the surface of the wafer W.

Figure 3:
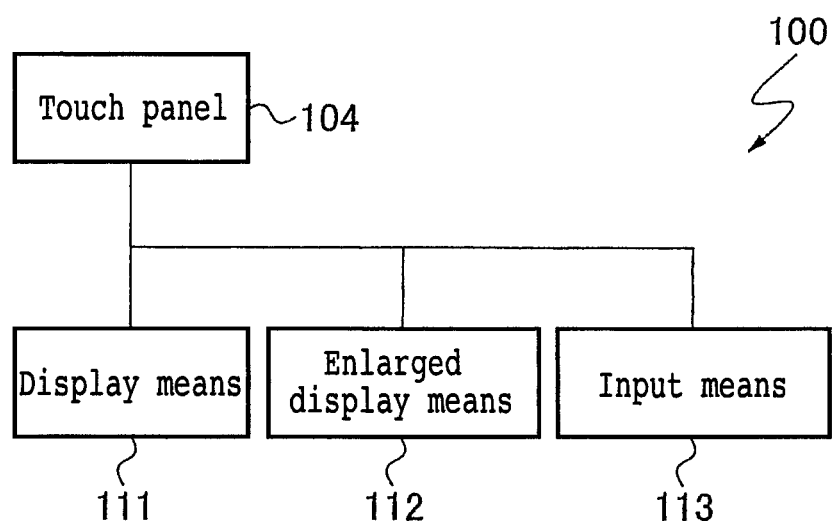
FIG. 3 is a functional block diagram of the touch panel device.

FIG. 3 shows the functions of the touch panel device 100 shown in FIG. 1. As shown in FIG. 3, the touch panel device 100 includes at least display means (display section) 111 for displaying a plurality of input fields on the touch panel 104, enlarged display means (enlarged display section) 112 for displaying, at enlarged scale, one of the displayed input fields in which the operator wants to enter data and which is touched by the operator, and input means (input section) 113 for displaying a software keyboard on the touch panel 104 which is to be used by the operator to enter data in the displayed enlarged input field and capturing processing condition data entered from the displayed enlarged input field. These means are realized by the CPU 101 which runs the program stored in the HDD 105 shown in FIG. 1.

Figure 4:
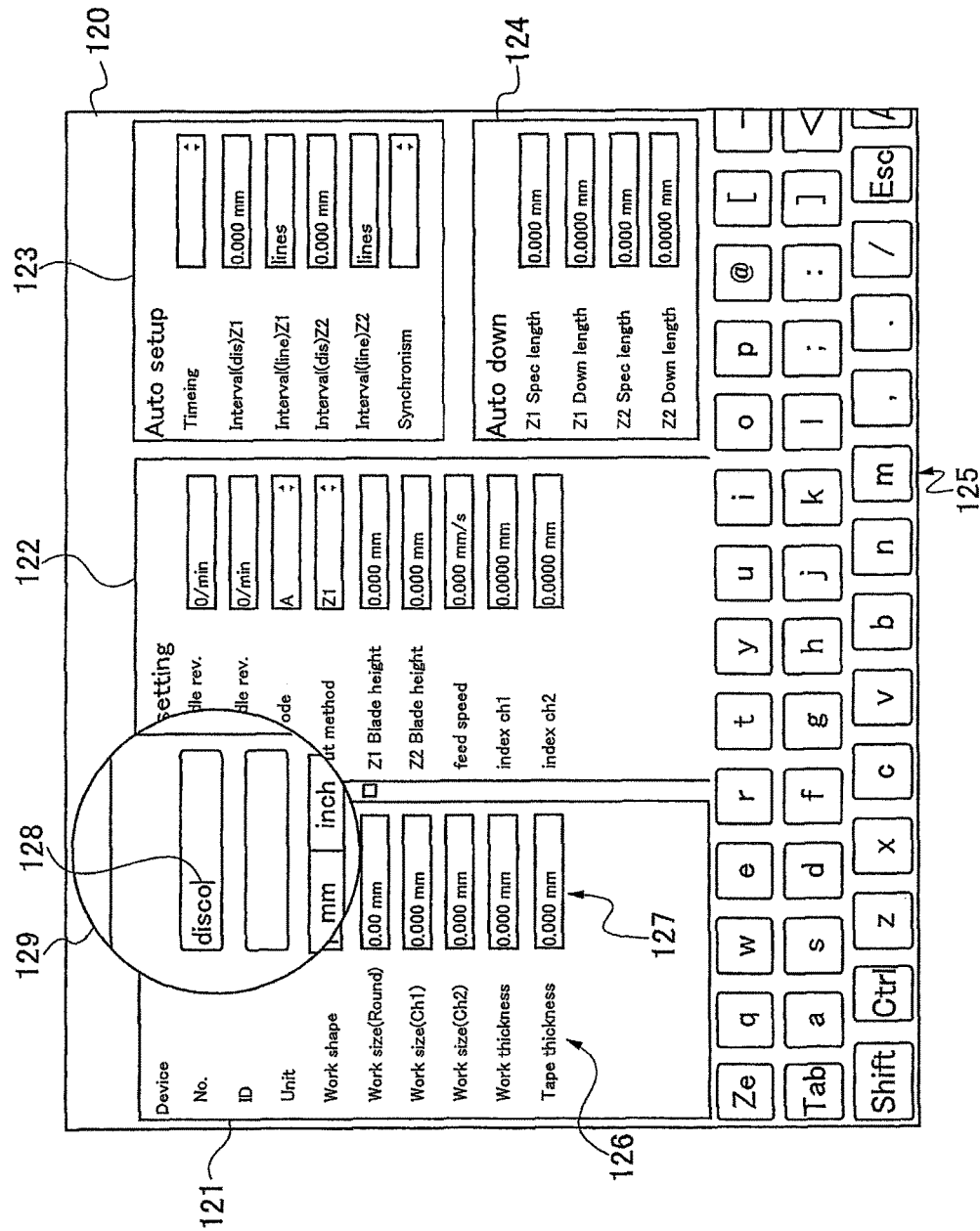
FIG. 4 is a view showing by way of example a display screen that is displayed on the touch panel device.

When the cutting apparatus 1 is activated, the display means 111 displays an image for prompting the operator to enter processing conditions on the touch panel 104, e.g., an input screen 120 shown in FIG. 4. The input screen 120 is made up of a "Device" area 121, a "Cut setting" area 122, an "Auto setup" area 123, an "Auto down" area 124, and a software keyboard area 125. Each of the areas of the input screen 120 displays a left column of item names 126 and a right column of input fields 127, positioned on the right side of the item names 126, for entering numerical values corresponding to the respective item names 126. In the example shown in FIG. 4, each of the input fields 127 is displayed in a horizontally elongate rectangular shape. However, each of the input fields 127 is not limited to such a rectangular shape. As long as the input fields 127 remain untouched, the software keyboard area 125 is not displayed.

The "Device" area 121 is an area for entering specifications of a workpiece, e.g., the wafer W, to be cut by the cutting apparatus 1 shown in FIG. 2. For example, the number of a device to be cut is entered in an input field 127 corresponding to an item name 126 "No." in the "Device" area 121. The length of the outer circumference of the wafer W shown in FIG. 2 is entered in an input field 127 corresponding to an item name 126 "Work size (Round)" in the "Device" area 121. The size in a Ch1 direction of the wafer W shown in FIG. 2 is entered in an input field 127 corresponding to an item name 126 "Work size (Ch1)" in the "Device" area 121. The size in a Ch2 direction of the wafer W shown in FIG. 2 is entered in an input field 127 corresponding to an item name 126 "Work size (Ch2)" in the "Device" area 121. The value of the thickness of the wafer W is entered in an input field 127 corresponding to an item name 126 "Work thickness" in the "Device" area 121.

The "Cut setting" area 122 is an area for entering operating conditions of the cutting apparatus 1 in a cutting process. For example, the value of a vertical position in the Z-axis direction of the cutting blade 30 of the first cutting means 3a shown in FIG. 2 is entered in an input field 127 corresponding to an item name 126 "Z1 Blade height" in the "Cut setting" area 122. The value of a vertical position in the Z-axis direction of the cutting blade 30 of the second cutting means 3b shown in FIG. 2 is entered in an input field 127 corresponding to an item name 126 "Z2 Blade height" in the "Cut setting" area 122. The value of a feed speed in the X-axis direction of the chuck table 7 fed by the cutting feed means 2 shown in FIG. 2 is entered in an input field 127 corresponding to an item name 126 "feed speed" in the "Cut setting" area 122.

The "Auto setup" area 123 is an area for entering conditions for automatic setup (hereinafter referred to as "setup") of reference positions for the respective first and second cutting means 3a and 3b in the Z-axis direction. For example, the value of a distance that cutting has been performed as an interval for setup of the first cutting means 3a is entered in an input field 127 corresponding to an item name 126 "Interval(dis) Z1" in the "Auto setup" area 123. The value of the number of streets that have been cut as an interval for setup of the first cutting means 3a is entered in an input field 127 corresponding to an item name 126 "Interval(line) Z1" in the "Auto setup" area 123.

The "Auto down" area 124 is an area for entering descending distances for the respective first and second cutting means 3a and 3b in a cutting process. For example, the value of a descending distance that the first cutting means 3a is to be lowered is entered in an input field 127 corresponding to an item name 126 "Z1 Down length" in the "Auto down" area 124. The value of a descending distance that the second cutting means 3b is to be lowered is entered in an input field 127 corresponding to an item name 126 "Z2 Down length" in the "Auto down" area 124.

When the operator touches a particular input field, a software keyboard for entering data in input fields is displayed in the software keyboard area 125 by the input means 113. For example, if an input field for requesting the input of a numerical value is selected by the operator, then a numeric keypad is displayed in the software keyboard area 125, and if an input field for requesting the input of alphabetical letters is selected by the operator, then alphabetical keys shown in FIG. 4 are displayed in the software keyboard area 125. Both the numeric keypad and the alphabetical keys may be displayed at the same time. When no input field is selected by the operator, the input means 113 does not display the software keyboard. The input means 113 displays the software keyboard only when an input field is selected by the operator.

When the operator touches a certain input field 127, the enlarged display means 112 shown in FIG. 3 performs a process of displaying the touched input field 127 at enlarged scale as shown in FIG. 4. This enlarged display process is a process for displaying a magnifying lens 129 in the display screen 120 shown in FIG. 4, and is carried out according to the flowchart of a magnifying lens display routine shown in FIG. 5. The enlarged display process will be described below with reference to the flowchart shown in FIG. 5.

The enlarged display means 112 shown in FIG. 3 monitors at all times whether either one of the input fields is touched or not (step S1). If either one of the input fields is touched by the operator, then the enlarged display means 112 first acquires coordinate information and size information of the touched input field (step S2). The coordinate information and the size information have been stored in advance in the RAM 103 shown in FIG. 1. The enlarged display means 112 reads the coordinate information and the size information from the RAM 103 and recognizes them. The coordinate information is stored as the numerical values of X and Y coordinates of the input field in an X-Y coordinate system whose X and Y axes extend horizontally and vertically, respectively, on the input screen 120 shown in FIG. 4. The size information is stored as the horizontal and vertical lengths of the input field if the input field is of a rectangular shape.

Then, the enlarged display means 112 decides whether or not the touched input field sticks out of the magnifying lens 129 when the input field is displayed at enlarged scale (step S3). Specifically, the enlarged display means 112 compares the diameter of the magnifying lens 129 with the size of the enlarged input field that is displayed, for example, to decide whether or not the touched input field sticks out of the magnifying lens 129. The diameter of the magnifying lens 129 is stored in the RAM 103 in advance. The enlarged display means 112 determines the size of the enlarged input field that is displayed by multiplying the length of the longer side (the horizontal length in FIG. 4) of the input field which is not enlarged, by a predetermined magnification ratio (e.g., 1.8). The diameter of the magnifying lens 129 and the magnification ratio for the input field may be entered and set by the operator through the touch panel 104. In the example shown in FIG. 4, the magnifying lens 129 is of a circular shape. However, the magnifying lens 129 may be of any of other shapes such as a square shape insofar as it allows a space for displaying the software keyboard area 125 to be kept on the input screen 120, and is not limited to any size. If the magnifying lens is of a rectangular shape, for example, then the enlarged display means 112 compares the length of the longer side of the enlarged input field which is displayed with the length of a side of the magnifying lens in the same direction as the longer side of the input field to decide whether or not the touched input field sticks out of the rectangular magnifying lens.

If the enlarged display means 112 decides that the diameter of the magnifying lens 129 is larger than the longer side of the enlarged input field and hence there is no possibility of the input field sticking out of the magnifying lens 129, then the center of the input field is set as the center of the displayed magnifying lens 129 (step S4). The coordinates of the center of the input field are determined on the basis of the coordinates of the four corners of the input field which have been stored in advance in the RAM 103, for example.

If the enlarged display means 112 decides that the diameter of the magnifying lens 129 is smaller than the longer side of the enlarged input field and hence there is a possibility that the input field may stick out of the magnifying lens 129, then the cursor position in the input field is set as the center of the displayed magnifying lens 129 (step S5). The cursor position in the input field has been recognized by the input means 113.

After step S4 or step S5, the enlarged display means 112 acquires an image of the magnifying lens 129 whose center has been set in step S4 or step S5 and which includes an image of the periphery (step S6). The acquired image includes a displayed cursor.

Then, the enlarged display means 112 generates an enlarged image wherein the image acquired in step S6 is magnified by the predetermined magnification ratio, and displays its image information as the magnifying lens 129 shown in FIG. 4 on the touch panel 104 (step S7). At this time, the enlarged display means 112 displays the cursor 128 in the touched input field. For the acquisition of the image in step S6, a choice is available of various images including an image of an input field only, an image of an input field and a corresponding input item, an image of plural input fields, and an image of plural input fields and corresponding plural input items, and any one of these images may be selected depending on the size and shape of the magnifying lens 129. Information as to which image is to be selected from these variations may be stored in advance in the RAM 103 or the like, or may be entered and set by the operator through the touch panel 104. In step S7, the image acquired in step S6, i.e., a selected one of an image of an enlarged input field only, an image of an enlarged input field and a corresponding enlarged input item, an image of enlarged plural input fields, and an image of enlarged plural input fields and corresponding enlarged plural input items, is displayed at enlarged scale.

The enlarged display means 112 sets an enlarged region for displaying a plurality of input fields in the magnifying lens 129, as in the case of the magnifying lens 129 shown in FIG. 4. The enlarged region thus set makes it possible to prevent an adjacent input field from being concealed due to the enlarged display.

If another area than the input fields 127 is touched while the magnifying lens 129 is being displayed, then the enlarged display means 112 performs a process of deleting the magnifying lens 129 from the input screen 120 (step S8). The magnifying lens 129 remains displayed until another area than the input fields 127 is touched.

If it is necessary to move the magnifying lens 129, then the enlarged display means 112 can move the magnifying lens 129 in a desired direction, without deleting it, in response to an operation made by the operator. For example, on a display screen 130 shown in FIG. 6A, the entry of data in an input field 131 corresponding to an item name "Work size (ch1)" has been finished, the entry of data in an input field 132 corresponding to an item name "Work size (ch2)" has also been finished, and a cursor 136 is displayed at the end of the input field 132. When the operator is then to enter a value in an input field 133 corresponding to an item name "Work thickness," the enlarged display means 112 shifts a magnifying lens 135 downwardly for the entry of the value in the input field 133.

Figure 6A:
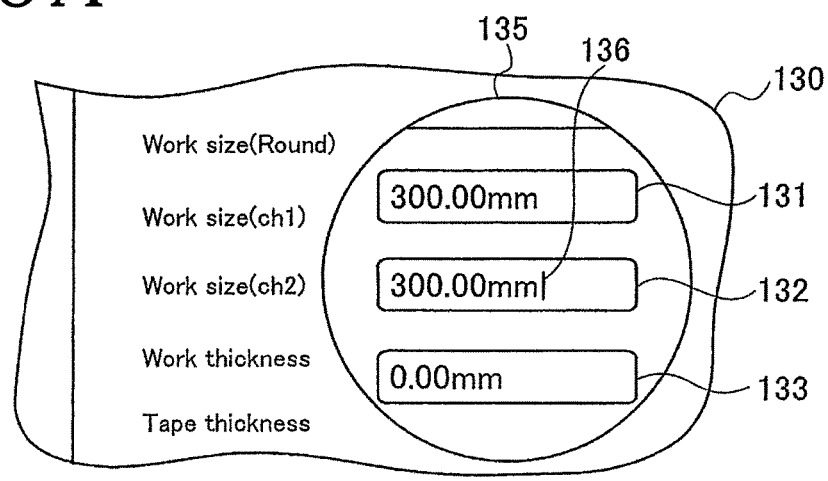
FIG. 6A is an enlarged fragmentary view of the display screen before the magnifying lens moves.
Figure 6B:
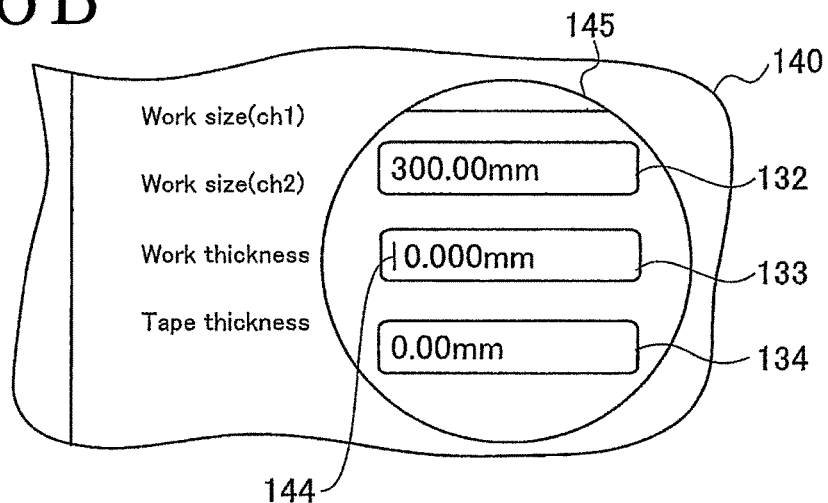
FIG. 6B is an enlarged fragmentary view of the display screen after the magnifying lens has moved.

When the operator is to enter data in an input field corresponding to an item name "Tape thickness" beneath the item name "Work thickness," since the input field is not displayed and no data can be entered within the magnifying lens 135 shown in FIG. 6A, the enlarged display means 112 moves the magnifying lens downwardly. The numbers and positions of the input fields are stored in advance in the RAM 103 or the like. When a lower portion of the magnifying lens 129 is touched, the enlarged display means 112 displays a magnifying lens whose center is positioned on an input field having a next number. Such a display process is carried out in the same manner as with steps S3 through S7 in the flowchart shown in FIG. 5. Specifically, when the operator touches a lower portion of the magnifying lens 129, e.g., an arbitrary position below the input field 132 within the magnifying lens 135 shown in FIG. 6A, the center of the magnifying lens 135 moves a distance commensurate with one input field, with the result that the enlarged display means 112 displays a magnifying lens 145 whose center is positioned on the input field 133 corresponding to the item name "Work thickness," on a display screen 140 shown in FIG. 6B. A cursor 144 also moves to the input field 133.

When the magnifying lens thus moves, an input field 134 is displayed in the magnifying lens 145, so that the input field 134 can be seen.

Although not shown, when the operator touches an upper portion of the magnifying lens 129, the enlarged display means 112 moves the magnifying lens 129 upwardly. In this case, the enlarged display means 112 displays a magnifying lens whose center is positioned on a next upper input field. Since the enlarged display means 112 is thus able to move the magnifying lens without deleting it from the input screen 120, the touch panel device 100 is high in operability and is effective to prevent the operator from losing sight of an input field in which to enter data.

In the above embodiment, the touch panel device is illustrated as being incorporated in the cutting apparatus. However, the touch panel device according to the present invention may be incorporated in various other processing apparatuses, in which case displayed input items are changed.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A touch panel device provided on a processing apparatus, comprising:
    display means for displaying a plurality of input fields in a device area in the touch panel device, the input fields having an associated item name, wherein each input field has a predetermined relative position with respect to the associated item name:
    enlarged display means for displaying, in an enlarged portion directly over a selected input field, a predetermined region including the selected one of the input fields in which an operator wants to enter data and which is touched by the operator and other input fields adjacent to the selected input field, the predetermined region being movable in a desired direction without deleting the predetermined region in response to an operation made by the operator; and input means for entering processing condition data in the selected input field displayed in the enlarged portion without fully concealing adjacent input fields, wherein the selected input field is not moved relative to the item name associated with the selected input field, and the selected input field is not moved with respect to the predetermined relative position when the selected input field is not in an enlarged portion.

2. The touch panel device according to claim 1,
    wherein the processing apparatus includes a cutting apparatus, and
    the input fields displayed by the display means are displayed on an input screen when the cutting apparatus is activated, and the input screen is made up of a device area, a cut setting area, an auto setup area, an auto down area, and a software keyboard area.

3. The touch panel device according to claim 2, wherein each of the device area, the cut setting area, the auto setup area, and the auto down area includes the item names associated with the input fields, and the enlarged display means displays a magnifying lens on the input screen for displaying, at enlarged scale, the one of the input fields when the operator selects and touches the one of the input fields.

* * * * *